United States Patent
Minami

(10) Patent No.: US 11,911,943 B2
(45) Date of Patent: Feb. 27, 2024

(54) APPARATUS FOR TAKING OUT MOLDED PRODUCT, METHOD OF ESTIMATING MASS OF TAKING PORTION OF THE APPARATUS, AND METHOD OF TAKING OUT MOLDED PRODUCT

(71) Applicant: Yushin Precision Equipment Co., Ltd., Kyoto (JP)

(72) Inventor: Koji Minami, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 0 days.

(21) Appl. No.: 17/947,351

(22) Filed: Sep. 19, 2022

(65) Prior Publication Data
US 2023/0091612 A1     Mar. 23, 2023

(30) Foreign Application Priority Data
Sep. 21, 2021   (JP) ................ 2021-153192

(51) Int. Cl.
    B29C 43/42     (2006.01)
    B29C 45/42     (2006.01)
    B29C 45/76     (2006.01)

(52) U.S. Cl.
    CPC ...... B29C 45/4225 (2013.01); B29C 45/7626 (2013.01); *B29C 2945/7602* (2013.01);
    (Continued)

(58) Field of Classification Search
    CPC . B29C 45/42; B29C 45/4005; B29C 45/4225; B29C 45/7626; B29C 45/92;
    (Continued)

(56) References Cited

U.S. PATENT DOCUMENTS

2015/0314507 A1*   11/2015   Jang ................. B29C 45/42
                                                         425/444

FOREIGN PATENT DOCUMENTS

JP     2002-326258     11/2002
JP     2007-205999     8/2007
(Continued)

OTHER PUBLICATIONS

European Search Report published in the corresponding European application 22 19 5836 dated Mar. 22, 2023; English text (3 pages).

*Primary Examiner* — Thu Khanh T. Nguyen
(74) *Attorney, Agent, or Firm* — Rankin, Hill & Clark LLP

(57) ABSTRACT

There are provided an apparatus for taking out a molded product that allows a physical amount such as the mass of the taking portion to be easily acquired with a relatively simple configuration. A posture reversing mechanism is provided between the elevating arm and the taking portion to change the direction of the taking portion between an unreversed state in which the taking portion is directed to be able to take hold of the molded product molded in the die, and a reversed state in which the length of the taking portion in the vertical direction is shorter than that in the unreversed state. A sensor detects vibration of the elevating arm. A mass estimating section estimates the mass of the taking portion on the basis of vibration of the elevating arm detected by the sensor when the taking portion is in the reversed state.

12 Claims, 7 Drawing Sheets

(52) U.S. Cl.
CPC ............... *B29C 2945/76244* (2013.01); *B29C 2945/76481* (2013.01)

(58) Field of Classification Search
CPC .... B29C 2945/7602; B29C 2945/7613; B29C 2945/76421; B29C 2945/76317; B29C 2945/7624; B29C 2945/76244; B29C 2945/76481
See application file for complete search history.

(56) References Cited

FOREIGN PATENT DOCUMENTS

| | | |
|---|---|---|
| JP | 2010-111012 A | 5/2010 |
| JP | 2019-18568 A | 2/2019 |

* cited by examiner

APPARATUS FOR TAKING OUT MOLDED PRODUCT, METHOD OF ESTIMATING MASS OF TAKING PORTION OF THE APPARATUS, AND METHOD OF TAKING OUT MOLDED PRODUCT

TECHNICAL FIELD

The present invention relates to an apparatus for taking out a molded product, a method of estimating the mass of a taking portion of the apparatus, and a method of taking out a molded product.

BACKGROUND ART

An apparatus for taking out a molded product produced by a molding machine is requested to shorten take-out cycles in order to improve throughput. For example, a traverse-type apparatus for taking out a molded product is requested to increase the speed of operation to move a head (taking portion) in the transverse direction, the longitudinal direction, and the vertical direction, and increase the speed of operation to reverse the posture (operation to change the direction) of the head taking hold of the molded product.

In order to further shorten take-out cycles, however, it is necessary not only to simply increase the speed of the operation discussed above, but also to appropriately set control parameters for the operation. That is, the apparatus is configured such that the head is replaceable in accordance with the model of the molded product, and it is necessary to appropriately set control parameters in accordance with the mass of the head.

For example, control parameters that are appropriate for a case where a small head is mounted and control parameters that are appropriate for a case where a large head is mounted are inevitably different from each other. When a large head is mounted, vibration is occasionally caused when operation is stopped as a result of high-speed operation. When such vibration is caused, the next operation cannot be started until the vibration is converged, and as a result take-out cycles cannot be shortened. Therefore, take-out cycles can be shortened by suppressing the occurrence of vibration by reducing acceleration at the time of acceleration/deceleration, for example. In addition, setting the control parameters in this manner reduces a load on a servomotor that serves as a drive source and various portions of the apparatus, which also enables stable operation. When a small head is mounted, on the other hand, vibration is not likely to be caused when operation is stopped, and therefore take-out cycles can be shortened by increasing acceleration at the time of acceleration/deceleration and the speed of operation compared to the case where a large head is mounted.

The mass of a head can be measured in advance using a separately prepared mass meter, and input to the apparatus, for example. However, it is necessary to prepare mass meters that can support heads of different sizes and shapes, depending on the models of molded products, and it is also troublesome. There are proposed techniques to acquire the mass of a head in the state of being mounted to an apparatus for taking out a molded product, although such techniques are intended for different purposes (e.g. Japanese Patent Application Publication No. 2002-326258 [JPA 2002-326258] and Japanese Patent Application Publication No. 2007-205999 [JPA 2007-205999]).

SUMMARY OF INVENTION

Technical Problem

Japanese Patent Application Publication No. 2002-326258 discloses a method of estimating the mass of a head from information output from a servomotor that serves as a drive source to move an arm that supports the head. With this method, however, it is necessary to use parameters such as the sliding resistance of the motor during computation to estimate the mass. Such parameters have significant individual differences, and are fluctuated over time. Therefore, it is difficult to estimate the mass of the head for setting the control parameters discussed above with practically usable precision.

Japanese Unexamined Patent Application Publication No. 2007-205999 discloses a method of acquiring the mass of a head with the head being mounted to the distal end of an arm via a mass meter. With this method, however, the mass is increased by the addition of the mass meter, and therefore it is necessary to reduce acceleration at the time of acceleration/deceleration and the speed of operation compared to the case where a mass mater is not provided. In addition, the maximum mass of a molded product that can be held by the head is also reduced compared to the case where a mass meter is not provided. Further, a space formed when the die is opened must be increased when the size of the distal end portion of the arm is increased by the addition of the mass meter, compared to the case where a mass meter is not provided. In this case, it is difficult to shorten take-out cycles. Additionally, the cost is increased compared to the configuration in which a mass mater is not provided.

The present invention has been made in view of the foregoing circumstances, and has an object to provide an apparatus for taking out a molded product, a method of estimating the mass of a taking portion of the apparatus, and a method of taking out a molded product that allow a physical amount such as the mass of the taking portion to be easily acquired with a relatively simple configuration.

Solution to Problem

In order to achieve the object discussed above, the present invention adopts the following technical elements. First, the present invention assumes an apparatus for taking out a molded product molded in a die of a molding machine whereby the apparatus is operable to transfer the molded product out of the molding machine. The apparatus according to the present invention includes a taking portion, an arm, a posture reversing mechanism, a sensor, and a mass estimating section. The taking portion takes hold of the molded product molded in the die. The arm is provided to be capable of advancing and retracting in an opening direction of the die and moving up and down. The posture reversing mechanism is provided between the arm and the taking portion to change a direction of the taking portion between an unreversed state in which the taking portion is directed to be able to take hold of the molded product molded in the die, and a reversed state in which a length of the taking portion in a vertical direction is shorter than that in the unreversed state. The sensor detects vibration of the arm. The mass estimating section estimates a mass of the taking portion on a basis of vibration of the arm detected by the sensor when the taking portion is in the reversed state. For example, a vertical direction of the taking portion in the unreversed state corresponds to a horizontal direction in the reversed state.

With the present configuration, the mass of the taking portion can be acquired with the taking portion being mounted to the apparatus, and therefore it is not necessary to separately prepare a measurement instrument etc. configured to acquire the mass of the taking portion in advance. The sensor configured to detect vibration of the arm is relatively small and lightweight, and therefore the distal end portion of the arm is not disadvantageously increased in size or weight. Further, the mass of the taking portion is acquired on the basis of vibration of the arm for the case where the taking portion is in the reversed state, and therefore the mass of the taking portion can be acquired with practically no problem in precision, for example, even if the taking portion is elongated in the vertical direction when the taking portion is in the unreversed state.

In the apparatus, the sensor discussed above may be an acceleration sensor, a strain gauge, or a sensor configured to detect torque of a motor operable to drive the arm in the opening direction of the die. In this case, preferably, the sensor is disposed on the arm in a vicinity of a position at which the taking portion is mounted. Preferably, the mass estimating section estimates the mass of the taking portion on a basis of the vibration due to movement of the arm or the vibration due to a change into the reversed state caused by the posture reversing mechanism.

In the apparatus described above, the mass estimating section may estimate the mass on a basis of a natural frequency and stroke information of the vibration detected by the sensor. The stroke information of the vibration is the length of a beam for the case where the vibration is seen as vibration of a cantilever beam, and corresponds to the distance from the support position of the arm to the taking portion in the longitudinal direction of the arm. The mass estimating section may estimate the mass on a basis of a natural frequency of the vibration detected by the sensor and a natural frequency of vibration acquired in advance with a specific mass being mounted at a position at which the taking portion is mounted, in place of the taking portion.

The apparatus described above may further include a center-of-gravity estimating section configured to estimate a center-of-gravity position of the taking portion on a basis of the vibration of the arm detected by the sensor when the taking portion is in the reversed state, and the vibration of the arm detected by the sensor when the taking portion is in the unreversed state.

With the present configuration, the center-of-gravity position of the taking portion can also be acquired, and therefore the control parameters for operation of the posture reversing mechanism can be set in consideration of the center-of-gravity position. The present configuration is particularly suitable during use of the taking portion elongated in the vertical direction in the unreversed state.

From a different point of view, on the other hand, the present invention can also provide an apparatus for taking out a molded product, the apparatus being operable to acquire only a center-of-gravity position. That is, the apparatus according to the present invention includes a taking portion, an arm, a posture reversing mechanism, a sensor, and a center-of-gravity estimating section. The taking portion takes hold of the molded product molded in a die. The arm is provided to be capable of advancing and retracting in an opening direction of the die and moving up and down. The posture reversing mechanism is provided between the arm and the taking portion to change a direction of the taking portion between an unreversed state in which the taking portion is directed to be able to take hold of the molded product molded in the die, and a reversed state in which a length of the taking portion in a vertical direction is shorter than that in the unreversed state. The sensor detects vibration of the arm. The center-of-gravity estimating section estimates a center-of-gravity position of the taking portion on a basis of a mass of the taking portion acquired in advance and the vibration of the arm detected by the sensor when the taking portion is in the unreversed state.

With the present configuration, the center-of-gravity position of the taking portion can be acquired by acquiring the mass of the taking portion in advance.

From a yet different point of view, the present invention can provide a method of estimating a mass of a taking portion of a traverse-type apparatus for taking out a molded product molded in a die of a molding machine to be transferred out of the molding machine. That is, the method according to the present invention includes changing a direction of a taking portion of the apparatus such that a length of the taking portion in a vertical direction is shorter than that in a state in which the taking portion is able to take hold of the molded product molded in the die. The method includes vibrating an elevating arm of the apparatus in a state after the direction of the taking portion is changed. The method includes detecting the vibration. The method includes estimating a mass of the taking portion on a basis of the detected vibration of the elevating arm.

From a yet different point of view, the present invention can provide a method of taking out a molded product in a traverse-type apparatus for taking out a molded product molded in a die of a molding machine to be transferred out of the molding machine. That is, the method according to the present invention includes changing a direction of a taking portion of the apparatus such that a length of the taking portion in a vertical direction is shorter than that in a state in which the taking portion is able to take hold of the molded product molded in the die. The method includes vibrating an elevating arm of the apparatus in a state after the direction of the taking portion is changed. The method includes detecting the vibration. The method includes estimating a mass of the taking portion on a basis of the detected vibration of the elevating arm. The method includes determining one or more parameters to be used to control operation of the taking portion on a basis of the estimated mass of the taking portion. The method includes repeatedly molding a molded product in the die and taking out the molded product with the one or more parameters being set.

Effect of Invention

With the present invention, the apparatus which includes the posture reversing mechanism for the taking portion can easily acquire a physical amount such as the mass of the taking portion through a relatively simple configuration.

DESCRIPTION OF EMBODIMENTS

An embodiment of the present invention will be described in detail below with reference to the drawings. In the following, the present invention is embodied as a traverse-type apparatus for taking out a molded product whereby the apparatus is disposed on a fixed platen of a resin injection molding machine with a die that opens and closes in the horizontal direction and operable to transfer a molded product out of the resin injection molding machine using a lateral frame that extends in a direction orthogonal to the open-close direction of the die.

Figure 1:
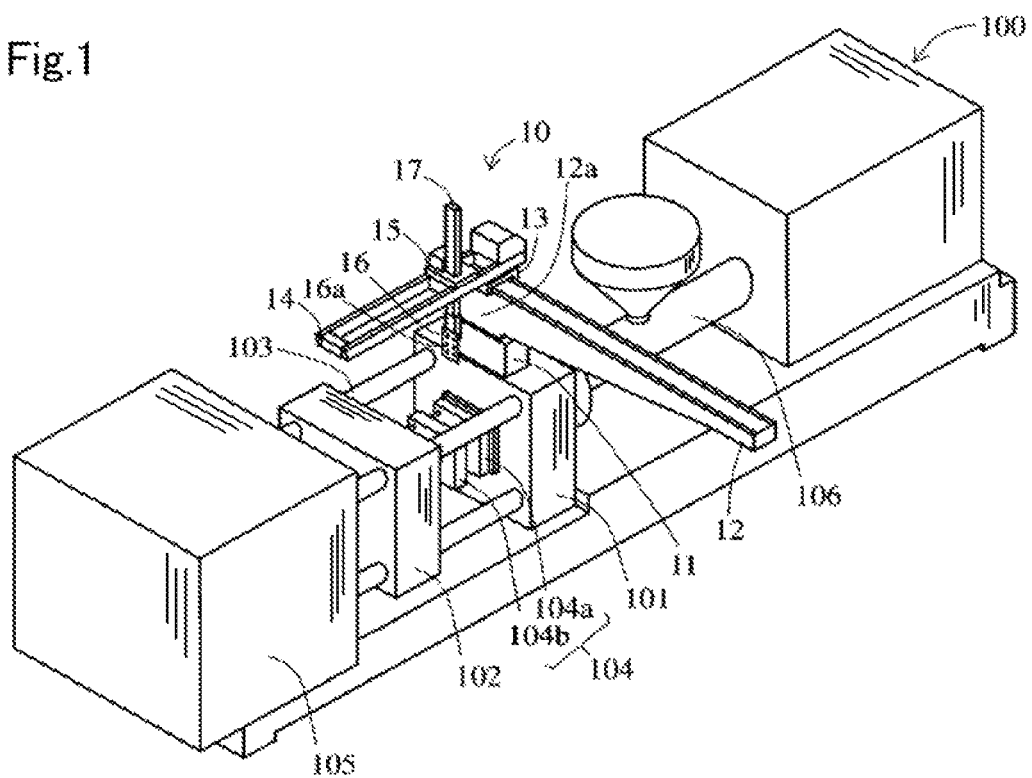
FIG. 1 is a perspective view schematically illustrating an example of an apparatus for taking out a molded product according to an embodiment of the present invention.

FIG. 1 is a perspective view schematically illustrating an apparatus 10 for taking out a molded product according to the present embodiment. As illustrated in FIG. 1, the apparatus 10 is fixed on a fixed platen 101 of a molding machine 100.

The molding machine 100 has a known structure, and includes the fixed platen 101 and a movable platen 102 disposed to face each other. The movable platen 102 is slidably supported on tie bars 103 disposed to extend along the horizontal direction from the four corners of the fixed platen 101. The movable platen 102 is driven in the horizontal direction by a die tightening device 105. A die 104, which is composed of a fixed die 104a mounted to the fixed platen 101 and a movable die 104b mounted to the movable platen 102, is closed and opened as the movable platen 102 is driven. When the die 104 is closed, a resin melted by heating is injected from an injection device 106 connected to the fixed platen 101 into a cavity of the die 104 to manufacture a molded product.

The apparatus 10 includes a mounting base 11, a lateral frame 12, a first travelling member 13, a pull-out frame 14, a second travelling member 15, a taking portion 16, and an elevating arm 17. The lateral frame 12 is disposed along the direction of transferring the molded product produced by the molding machine 100 out of the molding machine 100. In this example, as illustrated in FIG. 1, the lateral frame 12 is disposed along a direction perpendicular to a vertical plane including the axes of the tie bars 103 of the molding machine 100. The apparatus 10 is attached to the fixed platen 101 with the base end portion of the lateral frame 12 being fixed to the mounting base 11 installed on the fixed platen 101.

The first travelling member 13 is supported on the lateral frame 12, and advanced and retracted along the lateral frame 12 by a servomotor as a drive source. The pull-out frame 14 is disposed along the open-close direction of the die 104 with the base end portion of the pull-out frame 14 being fixed to the travelling member 13. The second travelling member 15 is supported on the pull-out frame 14, and advanced and retracted along the pull-out frame 14 by a servomotor as a drive source. The taking portion 16 is supported at the lower end of the elevating arm 17. The elevating arm 17 is disposed along the vertical direction, and advanced and retracted along the vertical direction by a servomotor of the second travelling member 15 as a drive source. The taking portion 16 is elevated and lowered along the vertical direction as the elevating arm 17 is moved in the vertical direction. In the present embodiment, the taking portion 16 includes a plurality of sucking pads 16a disposed at a position corresponding to a molded product formation position of the movable die 104b, although this is not specifically limiting. As is known, the sucking pads 16a suck up and hold the molded product by decompressing closed spaces formed between the sucking pads 16a and the molded product with the sucking pads 16a abutting against the molded product.

The apparatus 10 according to the present embodiment also includes a posture reversing mechanism 18 provided between the taking portion 16 and the elevating arm 17. The posture reversing mechanism 18 changes the direction of the taking portion 16 (hereinafter referred to as "posture reversing operation" as appropriate) between an unreversed state in which the taking portion 16 is directed to be able to take hold of the molded product molded in the die 104, and a reversed state in which the length of the taking portion 16 in a vertical direction is shorter than that in the unreversed state. In the unreversed state, the sucking pads 16a of the taking portion 16 are arranged in a vertical plane. In the reversed state, the vertical direction of the taking portion 16 in the unreversed state corresponds to the horizontal direction, that is, the sucking pads 16a are arranged in a horizontal plane.

Figure 2A:
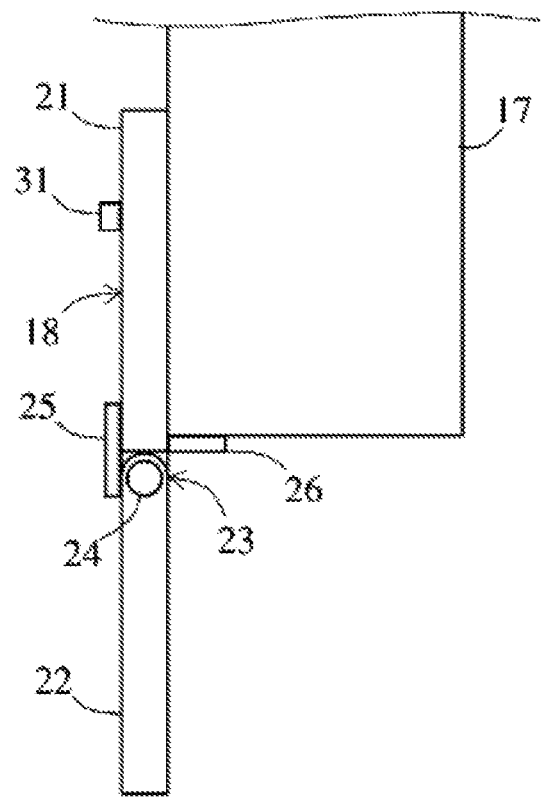
FIGS. 2A and 2B are each a side view schematically illustrating a posture reversing mechanism of the apparatus according to the embodiment of the present invention.
Figure 2B:
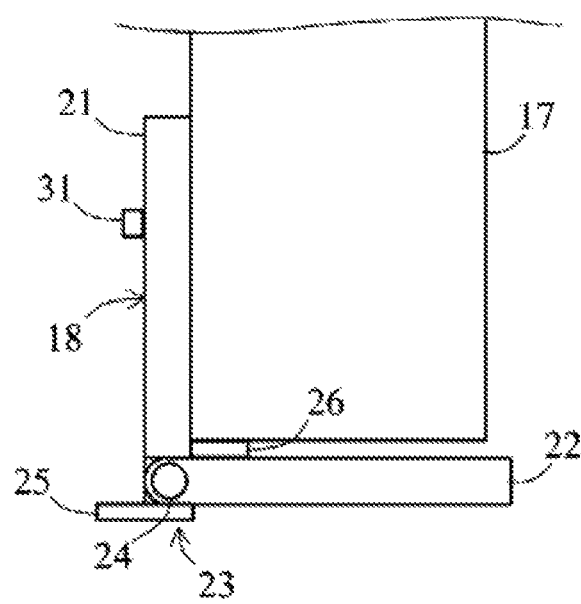

FIG. 2 is a side view schematically illustrating the posture reversing mechanism 18 according to the present embodiment. FIG. 2A corresponds to the unreversed state. FIG. 2B corresponds to the reversed state. In the present embodiment, the posture reversing mechanism 18 has a structure in which a base end portion 21 fixed to the distal end of the elevating arm 17 and a free end portion 22, to which the taking portion 16 is removably fixed, are coupled to each other through a hinge structure 23. The base end portion 21 and the free end portion 22 can be constituted from a rectangular plate-like member, for example.

The hinge structure 23 includes a rotary shaft 24 disposed in the horizontal direction. The taking portion 16 is switched from the reversed state to the unreversed state, or from the unreversed state to the reversed state, when the free end portion 22 is turned by 90 degrees about the rotary shaft 24. In this example, a stopper 25 configured to abut against the base end portion 21 to prohibit excessive rotation of the free end portion 22 extends from the upper end of a surface of the free end portion 22 on the side on which the taking portion 16 is mounted. With this, the free end portion 22 is not rotated beyond the state of extending along the vertical direction when the free end portion 22 is switched from the reversed state to the unreversed state. Similarly, a stopper 26 configured to abut against the free end portion 22 to prohibit excessive rotation of the free end portion 22 is provided in the vicinity of the lower end of the base end portion 21. With this, the free end portion 22 is not rotated beyond the state of extending along the horizontal direction when the free end portion 22 is switched from the unreversed state to the reversed state. The free end portion 22 is driven by a known driving unit such as an air cylinder, although not illustrated.

The apparatus 10 configured as described above executes operation to take out a molded product in the following steps, including: (1) elevation of the taking portion 16 from a molded product release position due to elevation of the elevating arm 17; (2) horizontal movement of the taking portion 16 from a location outside the molding machine to a location above the die 104 due to movement of the first travelling member 13 and the second travelling member 15; (3) lowering of the taking portion 16 to an open space between the fixed die 104a and the movable die 104b with the die being opened due to lowering of the elevating arm 17; (4) horizontal movement (forward movement) of the taking portion 16 to a molded product sucking position due to movement of the second travelling member 15; (5) horizontal movement (rearward movement) of the taking portion 16 to an elevatable position due to movement of the second travelling member 15; (6) elevation of the taking portion 16 due to elevation of the elevating arm 17; (7) horizontal movement of the taking portion 16 to a location outside the molding machine due to movement of the first travelling member 13 and the second travelling member 15; and (8) lowering of the taking portion 16 to the molded product release position due to lowering of the elevating arm 17. The taking portion 16 is maintained in the unreversed state in at least (3), (4), (5), and (6). The taking portion 16 is maintained in the reversed state at at least the molded product release position in (1) and (8).

Figure 3:
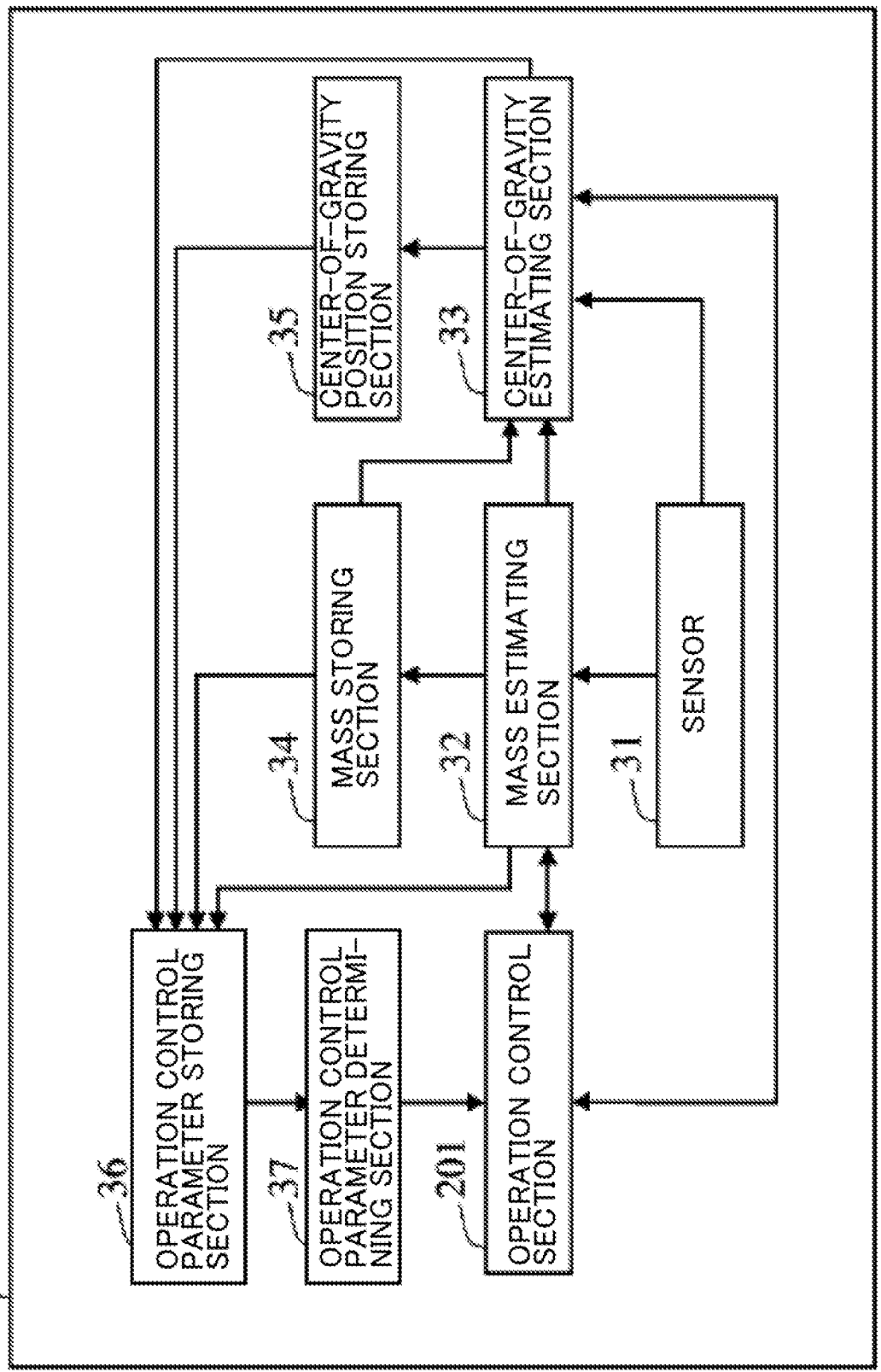
FIG. 3 is a functional block diagram illustrating an example of the apparatus according to the embodiment of the present invention.

FIG. 3 is a functional block diagram illustrating constituent elements of the apparatus 10 related to estimation of the mass of the taking portion 16. As illustrated in FIG. 3, the apparatus 10 according to the present embodiment includes a sensor 31, a mass estimating section 32, a center-of-gravity estimating section 33, a mass storage section 34, a center-of-gravity position storage section 35, an operation control parameter determining section 36, and an operation control parameter storage section 37. These functions can be implemented by a dedicated computation circuit or hardware including a processor and a memory, such as a random access memory (RAM) or a read only memory (ROM), and software stored in the memory to operate on the processor.

The sensor 31 is used to detect vibration of the elevating arm 17. An acceleration sensor is used as the sensor 31 to detect vibration of the elevating arm 17. The acceleration sensor is small, lightweight, and relatively inexpensive, and therefore is particularly suitable. Vibration of the elevating arm 17 can be detected by any method known in the art. For example, a strain gauge can be used to detect vibration, or vibration can be detected on the basis of drive torque of a servomotor (drive source for the second travelling member 15) that drives the elevating arm 17 in a direction along the opening direction of the die 104. When drive torque is used, the method of detecting a drive current is not specifically limited, and drive torque may be detected on the basis of a desired physical amount that is varied in correspondence with the magnitude of drive torque such as a drive current of the servomotor. The sensor 31 configured to detect vibration of the elevating arm 17 is preferably disposed in the vicinity of a position of the elevating arm 17 at which the taking portion 16 is mounted. In the present embodiment, the sensor 31 is disposed at the base end portion 21 of the posture reversing mechanism 18, although this is not specifically limiting.

The mass estimating section 32 estimates the mass of the taking portion 16 on the basis of vibration of the elevating arm 17 detected by the sensor 31 when the taking portion 16 is in the reversed state. The center-of-gravity estimating section 33 estimates the center-of-gravity position of the taking portion 16 on the basis of the vibration of the elevating arm 17 detected by the sensor 31 when the taking portion 16 is in the reversed state, and the vibration of the elevating arm 17 detected by the sensor 31 when the taking portion 16 is in the unreversed state. The mass storage section 34 stores the mass of the taking portion 16 acquired by the mass estimating section 32. Likewise, the center-of-gravity position storage section 35 stores the center-of-gravity position of the taking portion 16 acquired by the center-of-gravity estimating section 33.

The operation control parameter determining section 36 determines parameters to be used to control operation of the taking portion 16 during the operation to take out the molded product discussed above on the basis of the mass of the taking portion 16 stored in the mass storage section 34 and the center-of-gravity position of the taking portion 16 stored in the center-of-gravity position storage section 35. For example, the operation control parameter determining section 36 sets parameters for acceleration at the time of acceleration/deceleration and the operation speed for horizontal operation, elevating operation, and posture reversing operation of the taking portion 16, on the basis of the mass and the center-of-gravity position of the taking portion 16, that can suppress occurrence of vibration or application of an excessive load to various portions of the apparatus 10. The operation control parameter storage section 37 stores the parameters determined by the operation control parameter determining section 36. An operation control section 201 configured to control drive sources for implementing various operation during the operation of the apparatus 10 to take out the molded product discussed above drives the drive sources on the basis of the parameters for operation control stored in the operation control parameter storage section 37.

Figure 4:
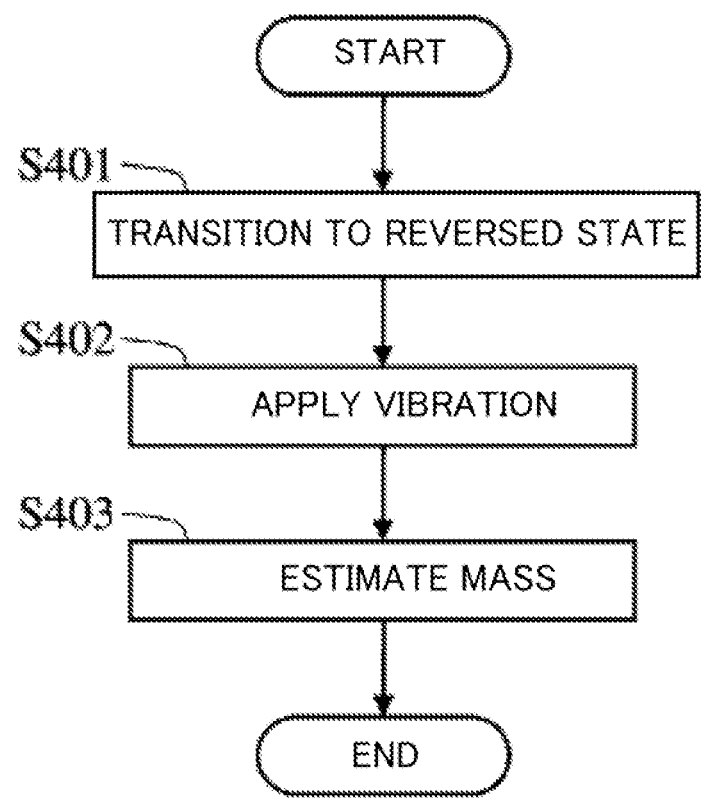
FIG. 4 is a flowchart illustrating an example of a method of estimating a mass using the apparatus according to the embodiment of the present invention.

Subsequently, the procedures of estimation of the mass of the taking portion 16 by the mass estimating section 32 will be described. FIG. 4 is a flowchart illustrating the procedures of mass estimation. Estimation of the mass of the taking portion 16 by the mass estimating section 32 can be performed during teaching in which a movement path of the taking portion 16 is stored in advance in the apparatus 10 or during trial operation performed to switch between models. The mass estimation can be started on the basis of a procedure start instruction input from an instruction input unit such as an operation panel, for example.

When a procedure start instruction is input, first, the mass estimating section 32 instructs the operation control section 201 to transition to a mass estimation preparation state. In response to the instruction, the operation control section 201 moves the taking portion 16 to a position at which the taking portion 16 does not interfere with the die 104, and drives the posture reversing mechanism 18 to bring the taking portion 16 into the reversed state (step S401 in FIG. 4).

In this state, vibration is applied to the elevating arm 17 (step S402 in FIG. 4). In the present embodiment, vibration is applied to the elevating arm 17 through movement of the elevating arm 17. Specifically, the operation control section 201 abruptly stops the second travelling member 15 which supports the elevating arm 17 after movement of the second travelling member 15 is started. Consequently, vibration can be applied to the elevating arm 17. The method of applying vibration to the elevating arm 17 is not specifically limited. For example, the operation control section 201 can apply vibration to the elevating arm 17 by transitioning the posture reversing mechanism 18 from the unreversed state to the reversed state. Alternatively, the elevating arm 17 or the taking portion 16 can be directly struck simply using a striking tool that does not damage the struck portion.

When vibration is applied to the elevating arm 17, the sensor 31 detects the vibration of the elevating arm 17. At this time, the mass estimating section 32 estimates the mass of the taking portion 31 on the basis of vibration of the elevating arm 17 detected by the sensor 31 (step S403 in FIG. 4). More specifically, the natural frequency of vibration detected by the sensor 31 is extracted to estimate the mass of the taking portion 16 using the natural frequency.

Figure 5A:
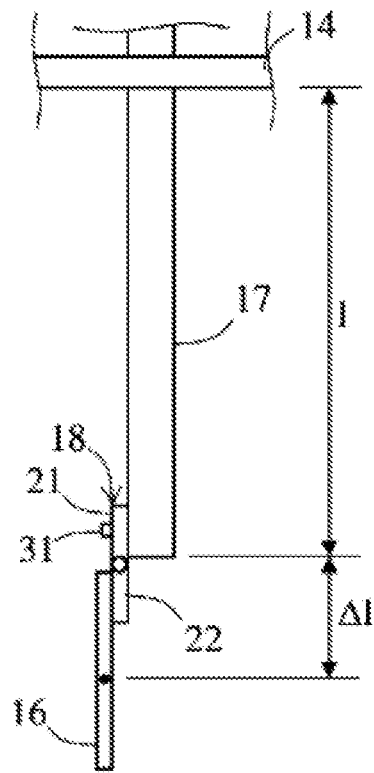
FIGS. 5A and 5B are each an enlarged side view schematically illustrating an elevating arm of the apparatus according to the embodiment of the present invention.
Figure 5B:
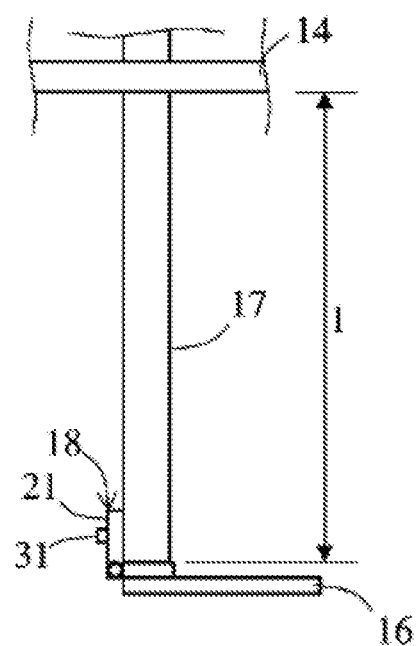

The principle of estimation of the mass of the taking portion 16 will be described. FIGS. 5A and 5B illustrate the mass estimation method. FIG. 5A schematically illustrates the vicinity of the elevating arm 17 for the case where the posture reversing mechanism 18 is in the unreversed state. FIG. 5B schematically illustrates the vicinity of the elevating arm 17 for the case where the posture reversing mechanism 18 is in the reversed state. In the present embodiment, the mass of the taking portion 16 is estimated by forming a model of vibration of a cantilever beam using the elevating arm 17, the posture reversing mechanism 18, and the taking portion 16.

When a material particle with a mass M is attached to the distal end of a cantilever beam with a length L, a natural frequency f of the vibration system is represented by the formula (1) using a longitudinal elastic modulus E, a geometrical moment of inertia I, and a linear density p. Thus, the mass M is represented by the following formula (2).

[Expression 1]

$$f = \frac{1}{2\pi}\sqrt{\frac{3EI}{L^3\left(M + \frac{33}{144}\rho L\right)}} \quad (1)$$

[Expression 2]

$$M = \frac{3EI}{4\pi^2 L^3 f^2} - \frac{33}{144}\rho L \quad (2)$$

The apparatus 10 includes the same lateral frame 12, first travelling member 13, pull-out frame 14, second travelling member 15, elevating arm 17, posture reversing mechanism 18, etc., which are mechanisms to move the taking portion 16, although the taking portion 16 is occasionally changed in accordance with the model of the molded product. That is, the apparatus 10 has the longitudinal elastic modulus E, the geometrical moment of inertia I, and the linear density ρ as intrinsic constants. Thus, the mass M of the taking portion 16 that is mounted can be calculated from the natural frequency f when the length L is determined. In the following, the length L will be referred to as "stroke information".

When the taking portion 16 is attached to the distal end of the elevating arm 17 via the posture reversing mechanism 18, the taking portion 16 projects vertically downward from the distal end (lower end) of the elevating arm 17 when the posture reversing mechanism 18 is in the unreversed state as illustrated in FIG. 5A. In this case, it is suitable to assume that the distal end of the beam of the cantilever beam model discussed above is located at the center-of-gravity position of the taking portion 16. It is reasonable to consider that the distal end of the beam is located below the distal end of the elevating arm 17 and above the lower end of the taking portion 16. However, it is not easy to know the position of the distal end of the cantilever beam model, that is, the center-of-gravity position, and therefore it is difficult to precisely calculate the mass M. It is possible to assume the length from the support position to the distal end of the elevating arm 17 as stroke information. However, a large error may be caused when calculating the mass of the taking portion 16 which is elongated in the vertical direction in the unreversed state, and the mass cannot be accurately calculated. It is also possible to measure the center-of-gravity position in advance for each type of the taking portion 16. However, this requires complicated work to specify the center-of-gravity position.

Thus, in the present embodiment, as discussed above, vibration caused when the posture reversing mechanism 18 is brought into the reversed state as illustrated in FIG. 5B is detected by the sensor 31. With this method, a large error is not caused even if it is assumed that the center-of-gravity position of the taking portion 16 is located at the distal end of the elevating arm 17. Thus, the mass M of the taking portion 16 can be estimated using the natural frequency f, by assuming the length from the support position to the distal end of the elevating arm 17 as the stroke information (the length L discussed above). With this method, in addition, the mass M of the taking portion 16 that is elongated in the vertical direction in the unreversed state can be estimated with approximately the same precision in the same procedures as the taking portion 16 that is short in the vertical direction in the unreversed state. That is, the mass of any taking portion 16 can be significantly easily acquired.

Figure 6A:
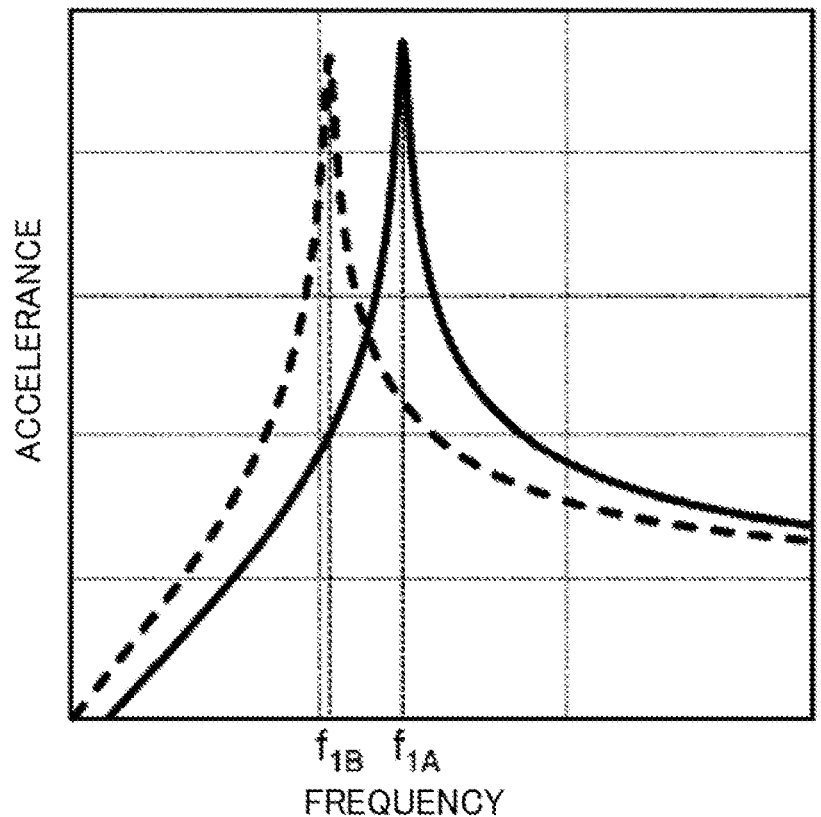
FIGS. 6A and 6B are each a chart schematically indicating the frequency distribution of vibration in the apparatus according to the embodiment of the present invention.
Figure 6B:
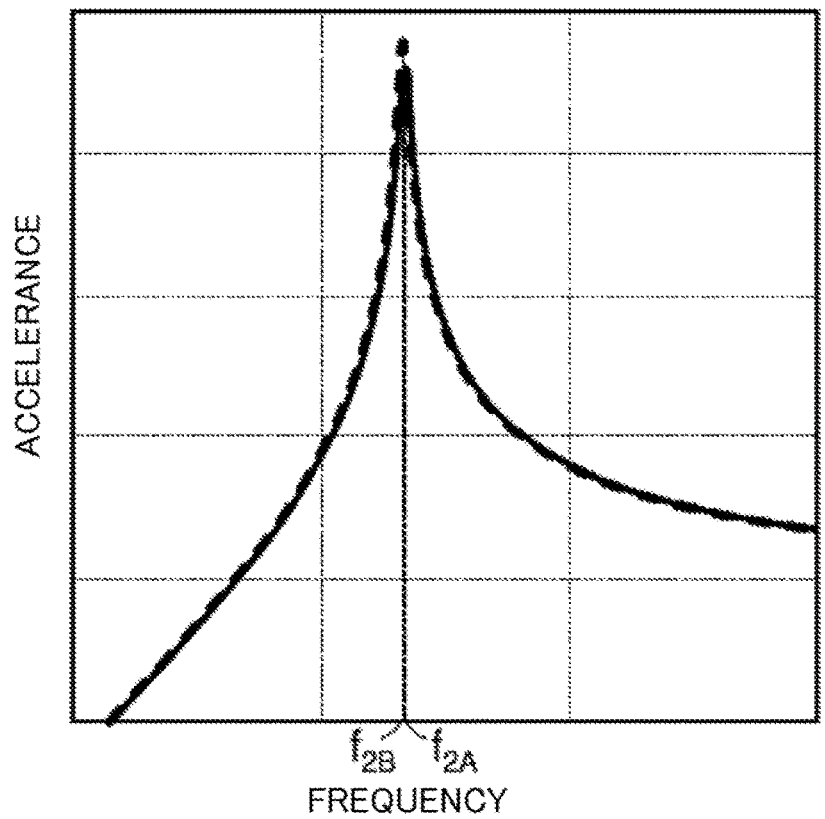

FIGS. 6A and 6B schematically indicate the frequency distribution of vibration detected by the sensor 31 when vibration is applied with mass pieces of the same mass but with different lengths in the vertical direction in the unreversed state being mounted to the free end portion 22 of the posture reversing mechanism 18. FIG. 6A indicates the frequency distribution of vibration applied in the unreversed state. FIG. 6B indicates the frequency distribution of vibration applied in the reversed state. In FIGS. 6A and 6B, the horizontal axis corresponds to the frequency, and the vertical axis corresponds to the accelerance. In FIGS. 6A and 6B, data for a mass piece A with a length of 20 cm in the vertical direction in the unreversed state are indicated by the solid line, and data for a mass piece B with a length of 40 cm in the vertical direction in the unreversed state are indicated by the broken line. The two mass pieces have the same length in the vertical direction in the reversed state.

As can be understood from FIG. 6A, there is a difference between a natural frequency $f_{1A}$ of the elevating arm 17 to which the mass piece A is mounted and a natural frequency $f_{1B}$ of the elevating arm 17 to which the mass piece B is mounted in the unreversed state. As can be understood from FIG. 6B, on the other hand, it can be considered that a natural frequency $f_{2A}$ of the elevating arm 17 to which the mass piece A is mounted and a natural frequency $f_{2B}$ of the elevating arm 17 to which the mass piece B is mounted are substantially the same as each other in the reversed state. That is, a natural frequency that matches the mass of the taking portion 16 that is mounted can be obtained, regardless of the length in the vertical direction in the unreversed state, by using vibration in the reversed state. For example, when it is assumed that the natural frequency $f_{2A}$, $f_{2B}$ acquired from vibration in the reversed state corresponds to the mass M of the mass piece A, B when the length from the support position to the distal end of the elevating arm 17 is defined as stroke information (length L), the natural frequency $f_{1A}$ of the mass piece A acquired from vibration in the unreversed state is several percent less than the natural frequency $f_{2A}$, and the mass of the mass piece A estimated from the natural frequency $f_{1A}$ corresponds to about 1.1 times M. In addition, the natural frequency $f_{1B}$ of the mass piece B is a dozen or so percent less than the natural frequency $f_{2B}$, and the mass of the mass piece B estimated from the natural frequency $f_{1B}$ corresponds to 1.6 times M. That is, it is considered that the mass of the mass piece B estimated from the natural frequency $f_{1B}$ acquired in the unreversed state contains an error at a practically unusable level.

The length from the support position to the distal end of the elevating arm 17 can be easily extracted from the coordinates in the three-dimensional coordinate system that is used by the apparatus 10 to control the position of the taking portion 16. The values of the longitudinal elastic modulus E, the geometrical moment of inertia I, and the linear density ρ can be determined using any method. Such values may be determined from the physical structure of the apparatus 10. Alternatively, the natural frequency of the elevating arm 17 may be measured at the time when vibration is applied with a plurality of mass pieces with a known mass being mounted to the free end portion 22 of the posture reversing mechanism 18 using the sensor 31 and such values may be determined through fitting etc. from the natural frequency and the stroke information at the time when the natural frequency is measured, for example. It is only necessary that the mass M could be estimated using the formula (2), and it is not necessary to individually calculate the values of the longitudinal elastic modulus E, the geometrical moment of inertia I, and the linear density ρ.

The length from the support position to the distal end of the elevating arm 17 is used as the stroke information. Also, it is possible to use as the stroke information a value in a range that is reasonably considered as the length L of a beam of a cantilever beam model, such as the length from the support position of the elevating arm 17 to the lower surface of the free end portion 22 of the posture reversing mechanism 18 in the reversed state.

The mass estimating section 32 which has completed estimation of the mass of the taking portion 16 as described above stores the estimated mass of the taking portion 16 in the mass storage section 34. Consequently, the procedures for estimating the mass of the taking portion 16 are ended.

Figure 7:
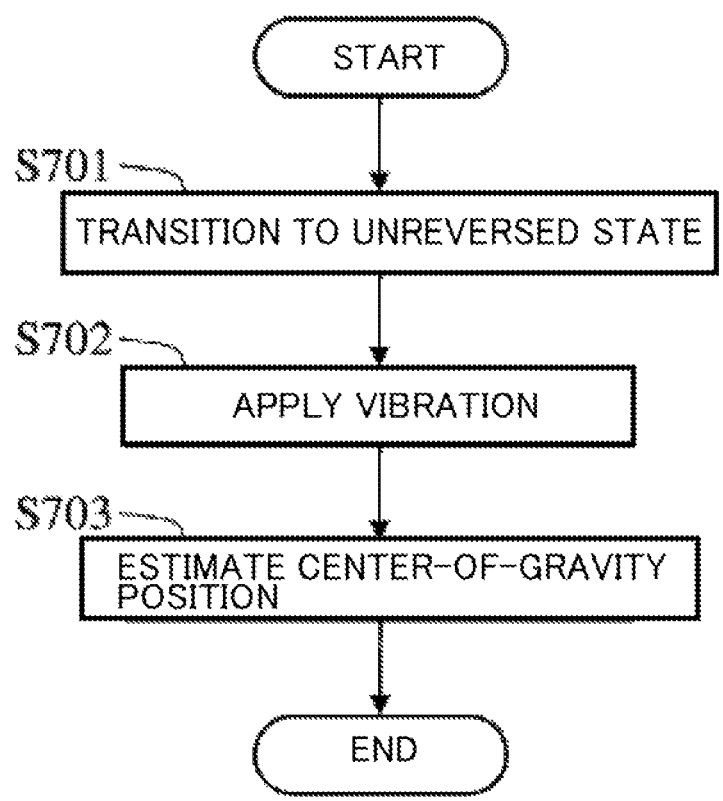
FIG. 7 is a flowchart illustrating an example of a method of estimating a center-of-gravity position using the apparatus according to the embodiment of the present invention.

Estimation of the mass of the taking portion 16 has been described above. The apparatus 10 according to the present embodiment can also estimate the center-of-gravity position of the taking portion 16 as necessary. The procedures of estimation of the center-of-gravity position of the taking portion 16 by the center-of-gravity estimating section 33 will be described. FIG. 7 is a flowchart illustrating the procedures of center-of-gravity position estimation. Estimation of the center-of-gravity position of the taking portion 16 by the center-of-gravity estimating section 33 can be performed subsequently to the mass estimation discussed above. In this case, the center-of-gravity estimating section 33 can be configured to start the procedures of center-of-gravity position estimation when the center-of-gravity estimating section 33 is notified of the mass of the taking portion 16 estimated by the mass estimating section 32 when the mass estimating section 32 has completed estimation of the mass of the taking portion 16.

When the indication is input, first, the center-of-gravity estimating section 33 instructs the operation control section 201 to transition to a center-of-gravity position estimation preparation state. In response to the instruction, the operation control section 201 drives the posture reversing mechanism 18 to bring the taking portion 16 into the unreversed state (step S701 in FIG. 7).

In the unreversed state, vibration is applied to the elevating arm 17 (step S702 in FIG. 7). Vibration is applied in any method as in the mass estimation discussed above. In the present embodiment, however, vibration is applied through operation to cause the posture reversing mechanism 18 to transition from the reversed state to the unreversed state at the time of transition to the center-of-gravity position estimation preparation state. Specifically, the operation control section 201 causes the stopper 25 of the free end portion 22 discussed above to strongly collide against the base end portion 21. Consequently, vibration can be applied to the elevating arm 17.

When vibration is applied to the elevating arm 17, the sensor 31 detects the vibration of the elevating arm 17. At this time, the center-of-gravity position estimating section 33 estimates the center-of-gravity position of the taking portion 16 on the basis of the mass of the taking portion 16 input from the mass estimating section 32 and vibration of the elevating arm 17 detected by the sensor 31 (step S703 in FIG. 7). More specifically, the natural frequency of vibration detected by the sensor 31 is extracted to estimate the center-of-gravity position of the taking portion 16 using the natural frequency in the unreversed state and the mass of the taking portion 16.

As discussed above, it is possible to consider that the center-of-gravity position of the taking portion 16, which is the distal end of the beam of the cantilever beam model discussed above, is located below the distal end of the elevating arm 17 and above the lower end of the taking portion 16 when the posture reversing mechanism 18 is in the unreversed state. It is meant that the length of the beam is longer in the unreversed state than the length of the beam of the cantilever beam model at the time when the posture reversing mechanism 18 is in the reversed state as illustrated in FIGS. 5A and 5B. When the amount of increase is defined as Δ1, the stroke information for the case where the posture reversing mechanism 18 is in the unreversed state is determined as 1+Δ1. The symbol "1" indicates the stroke information for the case where the posture reversing mechanism 18 is in the reversed state.

When the mass of the taking portion 16 is known, the stroke information (1+Δ1) can be calculated using the formula (2) discussed above. Since the stroke information 1 in the reversed state is also known as discussed above, the distance Al from the distal end of the elevating arm 17 to the center-of-gravity position of the taking portion 16 can also be easily calculated by subtracting the stroke information 1 from the stroke information (1+Δ1).

The center-of-gravity estimating section 33 which has completed estimation of the center-of-gravity position of the taking portion 16 as described above stores the estimated center-of-gravity position of the taking portion 16 in the center-of-gravity position storage section 35. Consequently, the procedures for estimating the center-of-gravity position of the taking portion 16 are ended.

In the particularly preferable embodiment described above, the center-of-gravity estimating section 33 is configured to receive input of the mass of the taking portion 16 estimated by the mass estimating section 32. However, the center-of-gravity estimating section 33 may not receive such input, and may be configured to estimate the mass on the basis of vibration applied when the posture reversing mechanism 18 is in the reversed state before step S701 discussed above.

In the present embodiment, as described above, the apparatus 10 which includes the posture reversing mechanism 18 can easily acquire a physical amount such as the mass or the center-of-gravity position of the taking portion 16 through a relatively simple configuration.

When only mass estimation is to be performed in the configuration described above, the mass estimating section 32 which has completed estimation of the mass of the taking portion 16 notifies the operation control parameter determining section 36 that the mass of the taking portion 16 is stored in the mass storage section 34. When mass estimation and center-of-gravity position estimation are to be performed, the center-of-gravity estimating section 33 which has completed estimation of the center-of-gravity position of the taking portion 16 notifies the operation control parameter determining section 36 that the center-of-gravity position of the taking portion 16 is stored in the center-of-gravity position storage section 35.

The operation control parameter determining section 36 determines parameters to be used to control operation of the taking portion 16 during the operation to take out the molded product discussed above on the basis of the mass of the taking portion 16 stored in the mass storage section 34 and the center-of-gravity position of the taking portion 16 stored in the center-of-gravity position storage section 35 as discussed above in response to the notification from the mass estimating section 32 or the center-of-gravity estimating section 33. The operation control parameter determining section 36 which has determined parameters to be used for operation control stores the determined parameters in the operation control parameter storage section 37. The parameters for operation control stored in the operation control parameter storage section 37 are used by the operation control section 201 to control drive sources for implementing various operation during the operation of the apparatus 10 to take out the molded product discussed above.

With the present invention, as described above, the apparatus which includes the posture reversing mechanism for the taking portion can easily acquire a physical amount such as the mass of the taking portion through a relatively simple configuration.

The embodiment discussed above does not limit the technical scope of the present invention, and may be subjected to a variety of modifications and applications that fall within the scope of the present invention, besides those already described. For example, in the embodiment described above, the reversed state is a state in which the vertical direction of the taking portion in the unreversed state is directed in the horizontal direction (rotated by 90 degrees). However, the reversed state may be any state in which the length of the taking portion in the vertical direction is shorter than that in the unreversed state, and is not limited to rotation of 90 degrees. In the embodiment described above, in addition, the center-of-gravity position of the taking portion is estimated using the mass of the taking portion estimated on the basis of vibration. However, the mass of the taking portion separately acquired using a mass meter etc. may be input to the mass storage section 34, and the center-of-gravity position of the taking portion may be estimated on the basis of the input mass. Further, the flowcharts illustrated in FIGS. 4 and 7 may be changed, as appropriate, in the order of steps etc. in the range in which an equivalent function can be achieved. The physical shapes of the elements that constitute the apparatus are merely exemplary, and may be changed as desired within the range in which the effect of the present invention can be achieved.

INDUSTRIAL APPLICABILITY

With the present invention, the apparatus which includes the posture reversing mechanism for the taking portion can easily acquire a physical amount such as the mass of the taking portion through a relatively simple configuration, and the present invention is applicable to an apparatus for taking out a molded product, a method of estimating the mass of a taking portion of the apparatus, and a method of taking out a molded product.

What is claimed is:

1. An apparatus for taking out a molded product molded in a die of a molding machine, the apparatus being operable to transfer the molded product out of the molding machine and comprising:

a taking portion configured to take hold of the molded product molded in the die;
    an arm provided to be capable of advancing and retracting in an opening direction of the die and moving up and down;
    a posture reversing mechanism provided between the arm and the taking portion to change a direction of the taking portion between an unreversed state in which the taking portion is directed to be able to take hold of the molded product molded in the die, and a reversed state in which a length of the taking portion in a vertical direction is shorter than that in the unreversed state;
    a sensor configured to detect vibration of the arm; and
    a mass estimating section configured to estimate a mass of the taking portion on a basis of vibration of the arm detected by the sensor when the taking portion is in the reversed state.

2. The apparatus for taking out a molded product according to claim 1, wherein
    a vertical direction of the taking portion in the unreversed state corresponds to a horizontal direction in the reversed state.

3. The apparatus for taking out a molded product according to claim 1, wherein
    the sensor is an acceleration sensor, a strain gauge, or a sensor configured to detect torque of a motor operable to drive the arm in the opening direction of the die.

4. The apparatus for taking out a molded product according to claim 1, wherein
    the sensor is disposed on the arm in a vicinity of a position at which the taking portion is mounted.

5. The apparatus for taking out a molded product according to claim 1, wherein
    the mass estimating section estimates the mass of the taking portion on a basis of the vibration detected by the sensor due to movement of the arm.

6. The apparatus for taking out a molded product according to claim 1, wherein
    the mass estimating section estimates the mass of the taking portion on a basis of the vibration detected by the sensor due to a change into the reversed state caused by the posture reversing mechanism.

7. The apparatus for taking out a molded product according to claim 1, wherein
    the mass estimating section estimates the mass on a basis of a natural frequency and stroke information of the vibration detected by the sensor.

8. The apparatus for taking out a molded product according to claim 1, wherein
    the mass estimating section estimates the mass on a basis of a natural frequency of the vibration detected by the sensor and a natural frequency of vibration acquired in advance with a specific mass being mounted at a position at which the taking portion is mounted, in place of the taking portion.

9. The apparatus for taking out a molded product according to claim 1, further comprising:
    a center-of-gravity estimating section configured to estimate a center-of-gravity position of the taking portion on a basis of the vibration of the arm detected by the sensor when the taking portion is in the reversed state, and the vibration of the arm detected by the sensor when the taking portion is in the unreversed state.

10. An apparatus for taking out a molded product molded in a die of a molding machine, the apparatus being operable to transfer the molded product out of the molding machine and comprising:

a taking portion configured to take hold of the molded product molded in the die;

an arm provided to be capable of advancing and retracting in an opening direction of the die and moving up and down;

a posture reversing mechanism provided between the arm and the taking portion to change a direction of the taking portion between an unreversed state in which the taking portion is directed to be able to take hold of the molded product molded in the die, and a reversed state in which a length of the taking portion in a vertical direction is shorter than that in the unreversed state;

a sensor configured to detect vibration of the arm; and a center-of-gravity estimating section configured to estimate a center-of- gravity position of the taking portion on a basis of a mass of the taking portion acquired in advance and the vibration of the arm detected by the sensor when the taking portion is in the unreversed state.

11. A method of estimating a mass of a taking portion of a traverse-type apparatus for taking out a molded product molded in a die of a molding machine to be transferred out of the molding machine, the method comprising:

changing a direction of the taking portion such that a length of the taking portion in a vertical direction is shorter than that in a state in which the taking portion is able to take hold of the molded product molded in the die;

vibrating an elevating arm of the apparatus in a state after the direction of the taking portion is changed;

detecting the vibration; and estimating a mass of the taking portion on a basis of the detected vibration of the elevating arm.

12. A method of taking out a molded product in a traverse-type apparatus for taking out a molded product molded in a die of a molding machine to be transferred out of the molding machine, using the method of claim 11 for estimating the mass of the taking portion, the method of taking out a molded product comprising:

determining one or more parameters to be used to control operation of the taking portion on a basis of the estimated mass of the taking portion; and repeatedly molding a molded product in the die and taking out the molded product with the one or more parameters being set.

* * * * *